(12) United States Patent
Schaeppi

(10) Patent No.: US 12,114,043 B2
(45) Date of Patent: Oct. 8, 2024

(54) SYSTEMS AND METHODS TO IDENTIFY TAXONOMICAL CLASSIFICATIONS OF TARGET CONTENT FOR PROSPECTIVE AUDIENCE

(71) Applicant: Solsten, Inc., Edina, MN (US)

(72) Inventor: Joseph Jack Schaeppi, Maple Grove, MN (US)

(73) Assignee: Solsten, Inc., Edina, MN (US)

( * ) Notice: Subject to any disclaimer, the term of this patent is extended or adjusted under 35 U.S.C. 154(b) by 0 days.

(21) Appl. No.: 17/833,868

(22) Filed: Jun. 6, 2022

(65) Prior Publication Data

US 2023/0396846 A1 Dec. 7, 2023

(51) Int. Cl.
 *H04N 21/466* (2011.01)
 *H04N 21/258* (2011.01)

(52) U.S. Cl.
 CPC ... *H04N 21/4665* (2013.01); *H04N 21/25866* (2013.01)

(58) Field of Classification Search
 CPC ............. H04N 21/4665; H04N 21/25866
 See application file for complete search history.

(56) References Cited

U.S. PATENT DOCUMENTS

| | | |
|---|---|---|
| 8,000,000 B2 | 8/2011 | Greenberg |
| 8,086,491 B1 | 12/2011 | Matz |
| 8,683,348 B1 | 3/2014 | Blank |
| 9,561,439 B2 | 2/2017 | Oono |
| 10,332,122 B1 | 6/2019 | Engstrom |
| 10,384,132 B2 | 8/2019 | Ware |
| 10,387,173 B1 | 8/2019 | Paulus |

(Continued)

FOREIGN PATENT DOCUMENTS

| | | |
|---|---|---|
| WO | 0106825 A2 | 2/2001 |
| WO | 2021247465 | 12/2021 |

OTHER PUBLICATIONS

App User Segmentation: Best Practices & Examples; Kadir Soner; https://appsamurai.com/app-user-segmentation-best-practices-examples/; Sep. 22, 2016; [retrieved from the internet on Apr. 21, 2020].

(Continued)

*Primary Examiner* — Mulugeta Mengesha
(74) *Attorney, Agent, or Firm* — Esplin & Associates, PC

(57) ABSTRACT

Systems and methods to identify taxonomical classifications of target content for prospective audience are disclosed. Exemplary implementations may: receive, via a client computing platform, an audience definition for a prospective audience; identify a set of the users based on the psychological profiles that include similar psychological parameter values as indicated by the audience definition; correlate one or more combinations of content parameter values with the prospective audience based on the interaction information characterizing interactions between the set of the users and the content parameter values that characterize the pieces of content that the set of the users interacted with; identify a set of prospective content, from the pieces of content with taxonomical classifications stored in the electronic storage, for the prospective audience based on the correlated one or more combinations of the content parameter values and the taxonomical classifications of the pieces of content stored in the electronic storage.

18 Claims, 4 Drawing Sheets

(56) References Cited

U.S. PATENT DOCUMENTS

| | | |
|---|---|---|
| 10,678,570 B2 | 6/2020 | Zarlengo |
| 10,832,154 B2 | 11/2020 | Kashyap |
| 10,881,964 B1 | 1/2021 | Dills |
| 10,987,592 B1 | 4/2021 | Schaeppi |
| 11,206,263 B1 | 12/2021 | Schaeppi |
| 2004/0097287 A1 | 5/2004 | Postrel |
| 2005/0240444 A1 | 10/2005 | Wooten |
| 2007/0033084 A1 | 2/2007 | Mascarenhas |
| 2007/0233671 A1 | 10/2007 | Oztekin |
| 2008/0045317 A1 | 2/2008 | Seelig |
| 2008/0081701 A1 | 4/2008 | Shuster |
| 2008/0126277 A1 | 5/2008 | Williams |
| 2009/0054123 A1 | 2/2009 | Mityagin |
| 2009/0076845 A1 | 3/2009 | Bellin |
| 2010/0022301 A1 | 1/2010 | Carpenter |
| 2010/0035220 A1 | 2/2010 | Herz |
| 2010/0083318 A1 | 4/2010 | Weare |
| 2010/0179950 A1 | 7/2010 | Willcock |
| 2010/0227302 A1 | 9/2010 | McGilvery |
| 2011/0035280 A1 | 2/2011 | Fordyce, III |
| 2012/0015737 A1 | 1/2012 | Craine |
| 2012/0022944 A1 | 1/2012 | Volpi |
| 2012/0036448 A1 | 2/2012 | John |
| 2012/0036449 A1 | 2/2012 | Minnis |
| 2012/0054040 A1* | 3/2012 | Bagherjeiran ......... G06Q 30/00 705/14.66 |
| 2012/0124062 A1 | 5/2012 | MacBeth |
| 2012/0142429 A1 | 6/2012 | Muller |
| 2012/0317064 A1 | 12/2012 | Hagiwara |
| 2013/0041759 A1* | 2/2013 | Mikan ............... G06Q 30/0269 705/14.66 |
| 2013/0111509 A1 | 5/2013 | Guo |
| 2013/0304686 A1 | 11/2013 | Antin |
| 2014/0001205 A1 | 1/2014 | Hodges |
| 2014/0017648 A1 | 1/2014 | Williams |
| 2014/0019443 A1 | 1/2014 | Golshan |
| 2014/0094311 A1 | 4/2014 | Kikuchi |
| 2014/0128166 A1 | 5/2014 | Tam |
| 2014/0156681 A1 | 6/2014 | Lee |
| 2014/0179408 A1 | 6/2014 | Ducheneaut |
| 2014/0195303 A1 | 7/2014 | Jarrett |
| 2014/0365887 A1 | 12/2014 | Cameron |
| 2015/0254995 A1 | 9/2015 | Rosenfeld |
| 2015/0279227 A1 | 10/2015 | Huber |
| 2015/0332603 A1* | 11/2015 | Aravkin ................ G09B 5/062 434/238 |
| 2015/0365449 A1 | 12/2015 | Kurata |
| 2016/0015307 A1 | 1/2016 | Kothuri |
| 2016/0067612 A1 | 3/2016 | Ntoulas |
| 2016/0345060 A1 | 11/2016 | Marci |
| 2017/0036116 A1 | 2/2017 | Cohen |
| 2017/0111461 A1* | 4/2017 | Kelman ................ H04L 67/535 |
| 2017/0149773 A1 | 5/2017 | Kovacs |
| 2017/0186334 A1 | 6/2017 | Sasidhar |
| 2017/0251070 A1 | 8/2017 | Liu |
| 2018/0015370 A1 | 1/2018 | Sorek |
| 2018/0101860 A1 | 4/2018 | Fleming |
| 2018/0137780 A1 | 5/2018 | Toliver |
| 2018/0213058 A1 | 7/2018 | Loeb |
| 2019/0130511 A1 | 5/2019 | Davier |
| 2019/0253431 A1 | 8/2019 | Atanda |
| 2020/0051450 A1 | 2/2020 | Yeh |
| 2020/0065081 A1 | 2/2020 | Lee |
| 2020/0151278 A1 | 5/2020 | Seida |
| 2020/0206637 A1 | 7/2020 | Robbins |
| 2020/0221181 A1 | 7/2020 | Gupta |
| 2020/0237291 A1 | 7/2020 | Sundaram |
| 2020/0320335 A1 | 10/2020 | Shamun |
| 2020/0351537 A1 | 11/2020 | Browy |
| 2020/0401216 A1 | 12/2020 | Sanger |
| 2021/0043031 A1 | 2/2021 | Keilwert |
| 2021/0146258 A1 | 5/2021 | Pedersen |
| 2021/0202045 A1 | 7/2021 | Neumann |
| 2021/0322887 A1 | 10/2021 | Schaeppi |
| 2021/0379495 A1 | 12/2021 | Schaeppi |
| 2022/0239653 A1 | 7/2022 | Schaeppi |
| 2022/0342791 A1 | 10/2022 | Schaeppi |
| 2022/0391932 A1 | 12/2022 | Schaeppi |
| 2022/0398340 A1 | 12/2022 | Jakobsson |
| 2022/0401844 A1 | 12/2022 | Schaeppi |
| 2023/0120897 A1 | 4/2023 | Kozlowski, III |
| 2023/0177205 A1 | 6/2023 | Schaeppi |
| 2023/0245175 A1 | 8/2023 | Schaeppi |
| 2024/0055132 A1 | 2/2024 | Schaeppi |
| 2024/0062908 A1 | 2/2024 | Schaeppi |
| 2024/0127311 A1 | 4/2024 | Schaeppi |

OTHER PUBLICATIONS

PCT International Search Report for Application No. PCT/US2021/035096, mailed Jun. 30, 2021, (6 pages).
Advanced Dungeon Dragons Game Master (Year: 1979).
University of Chicago, Nobel Prize Winner James Heckman, Economics of Personality Traits, J. of Human Resources XLIII p. 972-1059 (Year: 2006).
PCT International Search Report and Written Opinion for Application No. PCT/US2022/025379, mailed Aug. 18, 2022 (9 pages).
PCT International Search Report and Written Opinion for Application No. PCT/US2022/051224, mailed Mar. 1, 2023 (8 pages).
PCT International Search Report and Written Opinion for Application No. PCT/US2023/011637, mailed Mar. 24, 2023 (10 pages).
Advanced Dungeon Dragons Game Master (Year: 1979) 240 pages.
PCT International Search Report and Written Opinion for Application No. PCT/US23/76614, mailed Jan. 22, 2024 ( 9 pages).

* cited by examiner

SYSTEMS AND METHODS TO IDENTIFY TAXONOMICAL CLASSIFICATIONS OF TARGET CONTENT FOR PROSPECTIVE AUDIENCE

FIELD OF THE DISCLOSURE

The present disclosure relates to systems and methods to identify taxonomical classifications of target content for prospective audience.

BACKGROUND

Online platforms may be dynamic to tailor their content to individual users. In some instances, developers of digital environments may seek classifications of content to design and/or develop digital environments to ensure continuous interaction from users. In some instances, the developers may seek the classifications of content first to develop the digital environments based on the classifications of content for those of a target audience. Current technology does not provide a system or method to determine the classifications of content prior to developing the digital environments that are appropriate for the target audience specified. Much less, the currently technology does not determine the classifications of content based on psychological attributes that the target audience possess.

SUMMARY

One aspect the present disclosure is related to a system that facilitate determination of taxonomical classifications of content appropriate for a prospective audience for a digital environment. A requesting user (e.g., a platform developer) may input an audience definition that defines the prospective audience psychologically. That is, psychological parameters and/or psychological parameter values may be specified or determined based on the audience definition. Electronic storage included in the system may include taxonomical classifications of individual pieces of content, psychological profiles for users, and interaction information that indicates pieces of content that the users with the psychological profiles interact with or not. Based on the audience definition and psychological profiles associated with users known and stored by the system, a set of similar users may be determined. Based on the interaction information, the taxonomical classifications that define the pieces of content that the set of similar users interact with or not may be correlated with the prospective audience. Based on the correlations, a set of prospective content may be identified. This set of prospective content and/or the taxonomical classifications thereof may be presented to the requesting user. Thus, the system may improve current technology by providing suitable content and/or the taxonomical classifications for content for the prospective audience based on psychological attributes of the prospective audience as opposed to the requesting user developing the digital environment for a general audience.

One aspect of the present disclosure relates to a system configured to identify taxonomical classifications of target content for prospective audience. The system may include one or more hardware processors configured by machine-readable instructions. The machine-readable instructions may include one or more instruction components. The instruction components may include computer program components. The instruction components may include one or more of audience definition receiving component, user identifying component, correlation component, prospective content identifying component, presentation effectuation component, and/or other instruction components.

The audience definition receiving component may be configured to receive, via a client computing platform, an audience definition for a prospective audience. The audience definition may include psychological parameter values to a set of psychological parameters. Electronic storage may be configured to store taxonomical classifications of individual pieces of content. Individual taxonomical classifications may include content parameter values for content parameters that define classifications for the individual pieces of content, psychological profiles for users of digital environments, interaction information that characterizes interactions between users and the pieces of content via the digital environments, and/or other information. The taxonomical classifications may conform to a taxonomy that defines a hierarchical system of the content parameters that facilitate providing the pieces of content with the classifications. The pieces of content may be defined by the content parameter values for some or all of the content parameters. The psychological profiles may include the psychological parameter values for the psychological parameters.

The user identifying component may be configured to identify a set of the users based on the psychological profiles that include similar psychological parameter values as indicated by the audience definition.

The correlation component may be configured to correlate one or more combinations of content parameter values with the prospective audience based on the interaction information characterizing interactions between the set of the users and the content parameter values that characterize the pieces of content that the set of the users interacted with.

The prospective content identifying component may be configured to identify a set of prospective content, from the pieces of content with taxonomical classifications stored in the electronic storage, for the prospective audience based on the correlated one or more combinations of the content parameter values and the taxonomical classifications of the pieces of content stored in the electronic storage.

The presentation effectuation component may be configured to effectuate, via the client computing platform, presentation of the content parameter values to the content parameters for the set of prospective content.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As

DETAILED DESCRIPTION

Figure 1:
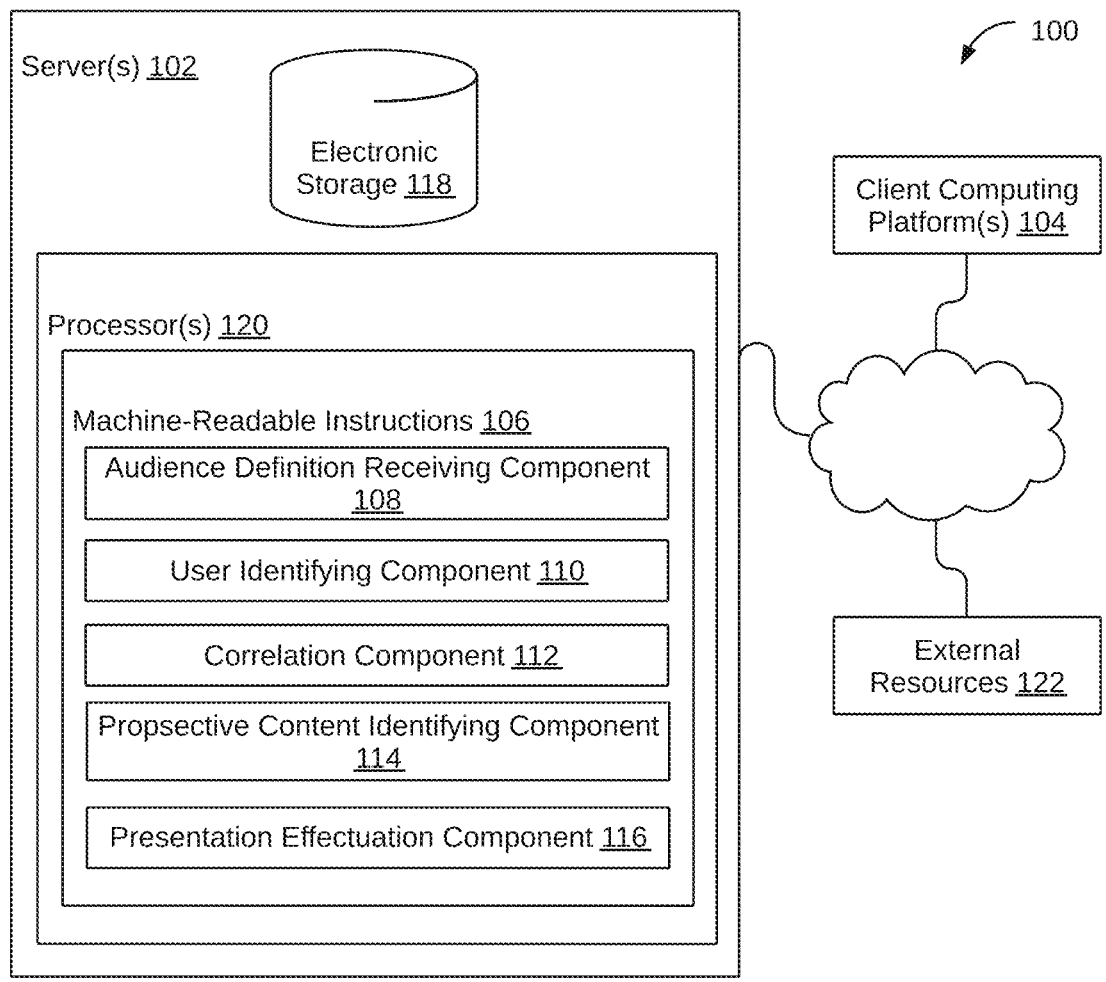
FIG. 1 illustrates a system configured to identify taxonomical classifications of target content for prospective audience, in accordance with one or more implementations.

FIG. 1 illustrates a system 100 configured to identify taxonomical classifications of target content for prospective audience, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of audience definition receiving component 108, user identifying component 110, correlation component 112, prospective content identifying component 114, presentation effectuation component 116, and/or other instruction components.

Electronic storage 118 may be configured to store taxonomical classifications of individual pieces of content, psychological profiles for users of digital environments, interaction information, and/or other information. The pieces of content may include a character, a game, a game asset, a recommendation, a suggestion, a promotion, and/or other pieces of content. The character may refer to an object (or group of objects) present in a virtual space that corresponds to an individual user (e.g., an avatar) and/or are controlled by the user. In some implementations, the character may not correspond to an individual user but rather provide information (e.g., the recommendation, the suggestion) to the user. The game asset may include a virtual item, a virtual resource (e.g., weapon, tool), in-game powers, in-game skills, in-game technologies, and/or other game assets. The recommendation may include a particular selection and/or action that the user is advised to select and/or do. The suggestion may include particular ideas, plans, strategies for the subject to consider executing, strategies for the subject to consider following, and/or strategies for the subject to consider is determined they will enjoy. The promotion may include discount codes, coupons, bonuses, and/or other promotions of the virtual items, products, and/or services that the user may utilize. By way of non-limiting example, products and/or services may relate to beauty (e.g., skincare, makeup), home improvement, decoration, clothing, accessories, technology, kitchen, and/or other categories.

Individual taxonomical classifications may include content parameter values for content parameters that define classifications for the individual pieces of content. The taxonomical classifications may conform to a taxonomy that defines a hierarchical system of the content parameters that facilitate providing the pieces of content with the classifications. The pieces of content may be defined by the content parameter values for some or all of the content parameters.

Some of the content parameters may be high order parameters and some of the content parameters may be lower order parameters. That is, a high order parameter may include more specific lower order parameters where the content parameter values more specifically describe the content as the content parameter values exist for the lower order parameters. In some implementations, a parameter may be one or more hierarchical orders within the taxonomy. The content parameters may include genre, platform-specific genre, mechanics, theme, art style and perspective, brand intellectual property, modes, churn, marketing assets, creative elements, and/or other content parameters. Such content parameters may be the higher order parameters of the content parameters.

The content parameter values may be a number within a defined range (e.g., 1-10), a binary number, a letter score, a yes or no, and/or other type of value. In some implementations, the content parameter values being within a particular range may signify that multiple ones of the content parameter values are similar. For example, the content parameter values for a first content parameter may be a number within a defined range of 0-20. The content parameter values of 1-5 may be considered similar content parameter values for the first content parameter. The psychological parameters may include the psychological parameters as listed in co-pending U.S. application Ser. No. 17/592,257 entitled "SYSTEMS AND METHODS TO IDENTIFY A TARGET AUDIENCE FOR PROSPECTIVE CONTENT BASED ON A TAXONOMY", the disclosure of which is incorporated by reference in its entirety herein.

The psychological profiles may be based on or derived from stated information and/or other information. The psychological profiles may include psychological parameter values for psychological parameters. The stated information may include answers of the users to questions presented to the users, descriptions provided by the users that describe their psychological traits and/or themselves generally, one or more pieces of content (e.g., music genre, color palette, television shows, etc.) the users like or have an affinity to, one or more pieces of content the users dislike or have an aversion to, and/or other stated information that the users may provide regarding themselves. The questions may be related to psychological attributes, real-world interactions, real-world likes and dislikes, and/or other questions.

The psychological profile for the given user may include psychological parameter values to psychological parameters derived from the stated information for the given user, and/or other information. Similarly, psychological profiles for the individual users may include sets of psychological parameter values to the psychological parameters for the individual users. The psychological parameters may include the psychological parameters as listed in co-pending U.S. application Ser. No. 16/854,660 entitled "SYSTEMS AND METHODS FOR ADAPTING USER EXPERIENCE IN A DIGITAL EXPERIENCE BASED ON PSYCHOLOGICAL ATTRIBUTES OF INDIVIDUAL USERS", the disclosure of which is incorporated by reference in its entirety herein. The psychological profiles may be associated with and/or generated in relation with digital environments such as particular online games, online platforms, online applications, and/or other digital environments as described in in co-pending U.S. application Ser. No. 17/545,866 entitled "SYSTEMS AND METHODS TO FACILITATE MANAGEMENT OF ONLINE SUBJECT INFORMATION", the disclosure of which is incorporated by reference in its entirety herein.

Parameters, such as content parameters and psychological parameters are described herein, may specify measurable, recordable, and/or determined information. The parameter values corresponding to the parameters may be a particular value, numerical or non-numerical, that characterizes the content, the users, or respective element that the parameter value is described in relation to.

The interaction information may characterize interactions between users and the pieces of content via the digital environments and/or engagement by the users with the pieces of content. By way of non-limiting example, the interaction information may include timing information, expense information, movement information related to the interactions with the content, behavior patterns of the user with or based on the pieces of content, and/or other interaction information.

The timing information may include values to length of time the users interacted with the individual pieces of content, how often the users interacted with the individual pieces of content in different instances, a start date/time at which the pieces of content are interacted with by the users, an end date/time at which the users stop interacting with the pieces of content after the start date/time, and/or other timing information. The expense information may include values to an amount spent during an interaction, an amount earned from sales (e.g., of during the interaction), an amount donated in relation to the pieces of content, an increase in valuation of a piece of content based on the interaction, a decrease in valuation of the piece of content based on the interaction, and/or other expense information. The movement information related to the interactions with the content may include values to orientation (e.g., yaw angle, roll angle, pitch angle) of the pieces of content upon the interaction, displacement of the pieces of content upon the interaction, kicking of the pieces of content, bouncing of the pieces of content, grabbing of the pieces of content, spinning of the pieces of content, and/or other movement information.

The behavior patterns of the individual users may include individual actions, sets of actions, ordered sets of actions, time spent by the individual users engaging with the content and/or the online platforms, spending patterns of the users characterized by the expense information, completed tasks by the individual users by utilizing the pieces of content, uncompletion tasks by the individual users based on lack of utilizing the pieces of content, failure of tasks by the individual users due to the pieces of content, and/or other behavior patterns. In some implementations, the behavior patterns may include multiple of the individual actions, the sets of actions, and the ordered set of actions. The actions may include one or more of a purchase, a sale, a trade, a donation, a user selection (e.g., to open, close, hide, terminate, delay, etc.), gameplay (e.g., mini-game, battle, competition, etc.), communication of the individual users with other particular users, frequent interaction with the content, closing or ignoring the content, formation of alliances by the users, and/or other actions with, of, or based on the pieces of content.

In some implementations, the interaction information may include or indicate whether the users have affinities for the individual pieces of content or aversions to the individual pieces of content. For example, given the timing information indicating that a first user frequently interacts with a first object (i.e., a piece of content) and for long lengths of time, the interaction information may indicate that the first user has an affinity to the first object. As another example, upon the behavior patterns of the first user including frequent selection to close or otherwise ignore a second piece of content, the interaction information may indicate that the first user has an aversion to the second piece of content and/or pieces of content with the same or similar content parameter values to the content parameters.

Audience definition receiving component 108 may be configured to receive, via client computing platform 104, an audience definition for a prospective audience. The prospective audience may be an audience that a requesting user of system 100 is requesting an audience of users for. The requesting user may include an online platform developer such a single user, a company, and/or other requesting user. The prospective audience may be a set of users that the requesting user wants to develop, design, generate, or otherwise provide content for.

In some implementations, the audience definition may characterize the prospective audience with one or more psychological parameters that prospective audience has, one or more psychological parameters that are strongly present in the prospective audience, specific psychological parameter values to the one or more psychological parameters, a response that the prospective audience would have to a particular inquiry, and/or other information that describes the prospective audience.

In some implementations, presentation effectuation component 116 may be configured to effectuate presentation of the psychological parameters via client computing platform 104 associated with the requesting user. Such presentation may enable the requesting user to select one or more psychological parameters the prospective audience would have and/or provide the psychological parameter values for one or more of the psychological parameters that characterize the prospective audience, i.e., the audience definition. In some implementations, the requesting user may prioritize one or more of the psychological parameters for the prospective audience from the most prevalent to less prevalent.

In some implementations, the audience definition may characterize the prospective audience by including content that the prospective audience would relate to, like, and/or otherwise interact with. For example, the audience definition may include a game, a game mechanic, an advertisement (e.g., an image, a video), an online platform (e.g., social media platform, a work management platform, a communication platform), a class (e.g., fitness class, an educational class, etc.), a philanthropic organization, a category of philanthropy (e.g., environmental, homelessness, animals, etc.), an image for consumption (e.g., purchase, download, sharing), a video for consumption, a non-fungible token, a television show, a movie, a brand, an interest, an activity, a brand, an art style, an application, an application feature, a theme, a subscription and/or other content that the prospective audience would too interact with. In some implementations, audience definition receiving component 108 may be configured to determine the one or more psychological parameters and psychological parameter values thereof for the prospective audience based on the audience definition including such content.

User identifying component 110 may be configured to identify a set of the users based on the psychological profiles that include similar psychological parameter values as indicated by the audience definition and/or determined based on the audience definition. Meaning, the psychological profiles of the users stored in electronic storage 118 may be analyzed against the psychological parameters and/or psychological parameter values thereof of the prospective audience to determine if they are similar. Determination of whether they are similar may include determining a defined amount of the psychological parameter values to the psychological parameters that are identical, whether a majority of the psychological parameter values to the psychological parameters are similar (e.g., within individual similar ranges), whether the psychological parameter values to the psychological parameters based on the prioritization of the psychological parameters are similar, machine learning for similarity determination techniques, and/or other determinations of similarity. The defined amount of the psychological parameter values to the psychological parameters that are identical may be specified by an administrative user of system 100, may be a fixed amount, percentage, and/or portion, may be modifiable by the administrative user, and/or other defined amount.

Correlation component 112 may be configured to correlate one or more combinations of content parameter values with the prospective audience based on the interaction information characterizing interactions, or lack thereof, between the set of the users and the taxonomical classifications of the pieces of content (i.e., the content parameter values) that the set of the users interacted with or avoid, and/or other information. Correlating the one or more combinations of content parameter values with the prospective audience may be based on the set of the users having affinities and/or aversions, as indicated by the interaction information, with particular ones of the pieces of content that have taxonomical classifications stored in electronic storage 118 and/or other information. In some implementations, the one or more combinations of content parameter values may be correlated with the audience definition as a whole. In some implementations, the one or more combinations of content parameter values may be correlated with specific psychological parameter values to specific psychological parameters included in the audience definition.

Correlation techniques to correlate the one or more combinations of content parameter values with the prospective audience may be contemplated. The correlations may convey that the one or more combinations of the content parameter values for the particular pieces of content are valued by the set of the users. It will be appreciated that the description herein of "correlations" between combinations of the content parameters and the prospective audience which are positively correlated is not intended to be limiting, and that negative correlations between combinations of the content parameters and the prospective audience are also contemplated, and may be included in the generic "correlations". The determination of negative correlations may be made in cases where individual pieces of content are avoided by users with a presence of or a strong presence of a psychological parameter similar to the prospective audience, and/or where users without presence of a psychological parameter values similar to the prospective audience have an affinity to particular content and thus particular content parameter values to the content parameters that are different than the one or more combinations of the content parameter values.

Prospective content identifying component 114 may be configured to identify a set of prospective content for the prospective audience based on the correlated one or more combinations of the content parameter values and the taxonomical classifications of the pieces of content stored in the electronic storage 118. That is, from the pieces of content with taxonomical classifications stored in electronic storage 118, the set of prospective content and the content parameter values that define it may be identified based on the one or more combinations of content parameter values included in the correlations. In some implementations, the set of prospective content may be identified based on negative correlations indicating that the prospective audience (as defined by the audience definition) avoid particular pieces of content, and/or that audiences classified as the opposite of the prospective audience have an affinity to certain pieces of content and thus the opposite or unsimilar of the certain pieces of content are identified.

Thus, the set of prospective content may be the target content for the prospective audience. In some implementations, identifying the set of prospective content for the prospective audience may be performed by determining the pieces of content with commonalities between their content parameter values that define the pieces of content and the one or more combinations of content parameter values. In some implementations, the commonalities may be that all of the content parameter values are identical between the combinations and the content parameter values of the pieces of content in electronic storage 118, that a majority of the content parameter values are identical, that all the content parameter values to the content parameters are within a particular range of each other (e.g., +1-2 points), that a majority of the content parameter values to the content parameters are with the particular range of each other, and/or other indications of commonality.

In some implementations, where there are negative correlations between the combinations of the content parameter values and the prospective audience, identifying the set of prospective content for the prospective audience may be performed by determining the pieces of content that are the opposite or different than such combinations of content parameter values. The various information determined, identified, and/or received as described herein may be stored to electronic storage 118 and/or other storage media in communication with system 100.

Presentation effectuation component 116 may be configured to effectuate, via client computing platform 104, presentation of the content parameter values to the content parameters for the set of prospective content. In some implementations, the set of prospective content may be presented such that the requesting user may export the prospective content and the content parameter values that define them via client computing platform 104. Thus, the prospective content may be utilized for design and/or development for digital environments.

Figure 3:
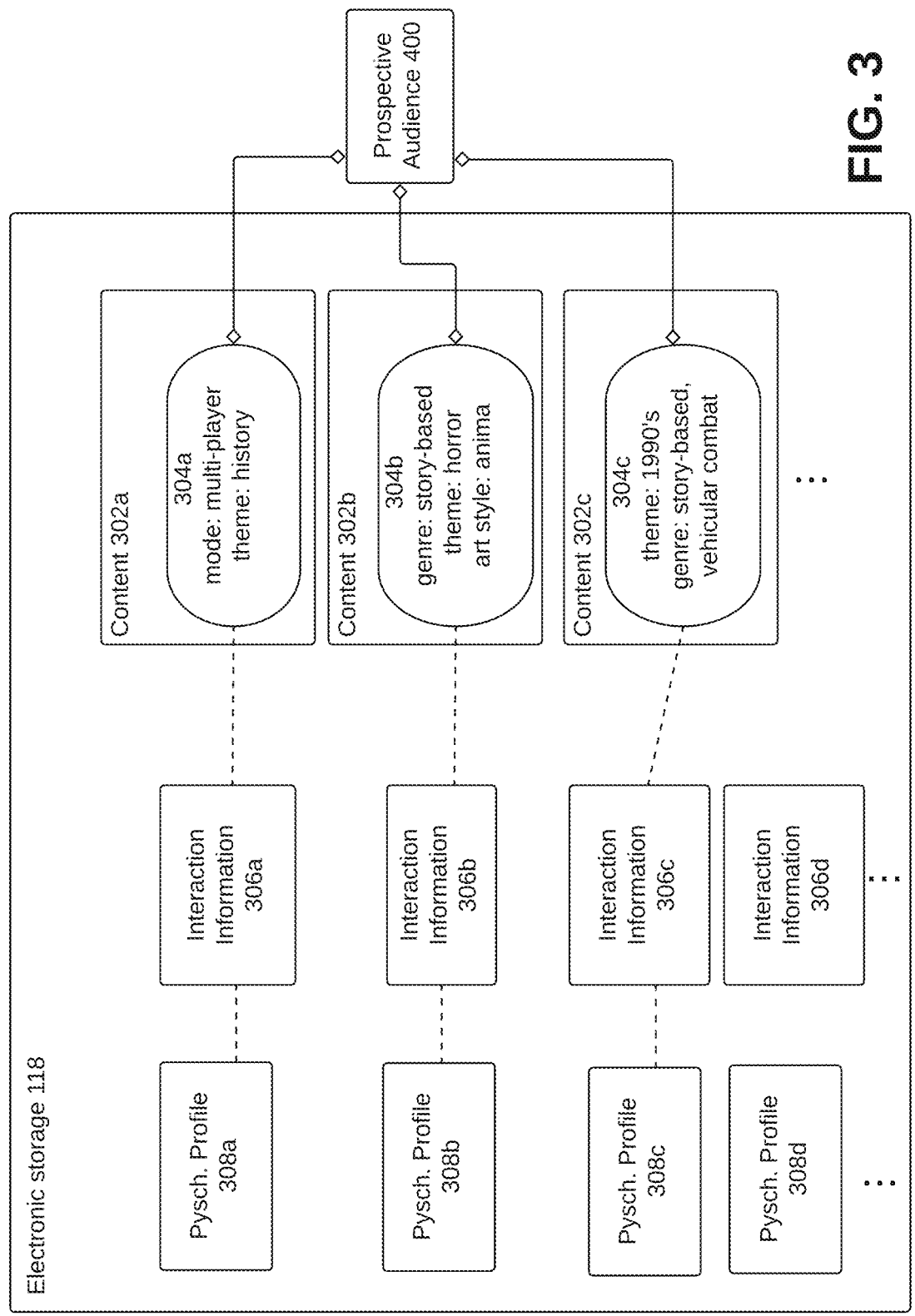
FIG. 3 illustrates an example implementation of the system configured to identify taxonomical classifications of target content for prospective audience, in accordance with one or more implementations.

FIG. 3 illustrates electronic storage 118 the same as or similar as in FIG. 1. Electronic storage 118 may store content 302a, 302b, and 302c defined by content parameter values 304a, 304b, and 304c, respectively. Electronic storage 118 may further store interaction information 306a, 306b, 306c, and 306d of the users who have interacted with the content stored, where stored interaction information 306a-c correspond to content 302a-c, respectively. Electronic storage 118 may further store psychological profiles 308*a*, 308*b*, 308*c*, and 308*d* for the users. Interaction information 306*a-c* may characterize how the users associated with psychological profiles 308*a-c*, respectively, interacted with content 302*a-c* (and thus, content values 304*a-c*), respectively.

Figure 4:
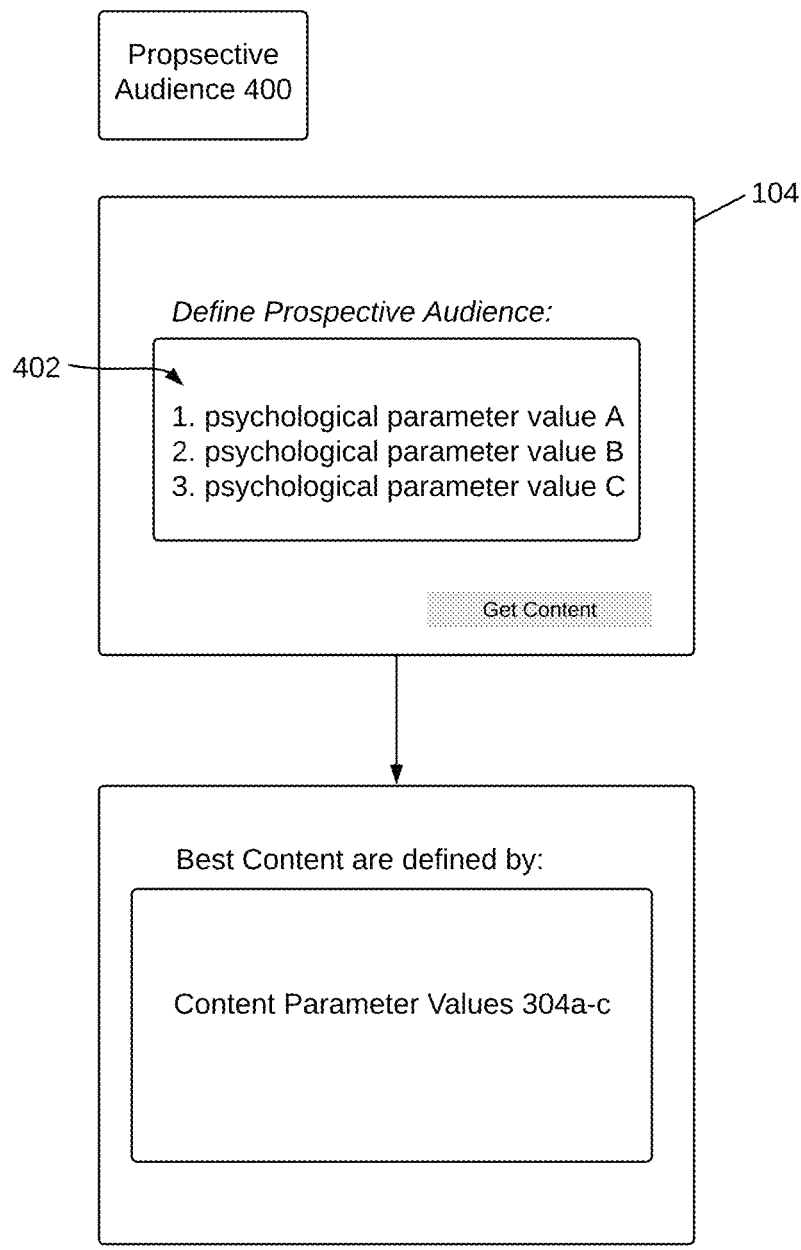
FIG. 4 illustrates an example implementation of the system configured to identify taxonomical classifications of target content for prospective audience, in accordance with one or more implementations.

FIG. 4 illustrates a requesting user utilizing system 100 (of FIG. 1) to determine target content for prospective audience 400. Prospective audience 400 may be characterized by audience definition 402 input by the requesting user via client computing platform 104. Based on similarities between psychological parameter values and/or psychological parameters as defined by audience definition 402 and the psychological profiles stored in electronic storage 118 in FIG. 3, psychological profiles 308*a-c* may be identified.

Referring to FIG. 3, based on psychological profiles 308*a-c* and interaction information 306*a-c*, content parameter values 304*a-c* (i.e., content parameter values the users with psychological profiles 308*a-c* have an affinity to), may be correlated with prospective audience 400 (the same as or similar as in FIG. 4). Such correlations may be stored to electronic storage 118 and/or other storage. Thus, particular content that may be liked or valued by prospective audience 400 may be identified based on the correlations of prospective audience 400 with content parameter values 304*a-c*. Content 302*a-c* and/or content parameter values 304*a-c* may be presented via client computing platform 104 in FIG. 4. As such, the requesting user may be provided with the target content for their prospective audience 400 and be enabled to efficiently design and/or develop content for prospective audience 400.

Referring back to FIG. 1, in some implementations, server(s) 102, client computing platform(s) 104, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 122 may be operatively linked via some other communication media.

A given client computing platform 104 may include one or more processors configured to execute computer program components. The computer program components may be configured to enable an expert or user associated with the given client computing platform 104 to interface with system 100 and/or external resources 122, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 122 may include sources of information outside of system 100, external entities participating with system 100, and/or other resources. In some implementations, some or all of the functionality attributed herein to external resources 122 may be provided by resources included in system 100.

Server(s) 102 may include electronic storage 118, one or more processors 120, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may comprise non-transitory storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor(s) 120, information received from server(s) 102, information received from client computing platform(s) 104, and/or other information that enables server(s) 102 to function as described herein.

Processor(s) 120 may be configured to provide information processing capabilities in server(s) 102. As such, processor(s) 120 may include one or more of a digital processor, an analog processor, a digital circuit designed to process information, an analog circuit designed to process information, a state machine, and/or other mechanisms for electronically processing information. Although processor(s) 120 is shown in FIG. 1 as a single entity, this is for illustrative purposes only. In some implementations, processor(s) 120 may include a plurality of processing units. These processing units may be physically located within the same device, or processor(s) 120 may represent processing functionality of a plurality of devices operating in coordination. Processor(s) 120 may be configured to execute components 108, 110, 112, and/or 114, and/or other components. Processor(s) 120 may be configured to execute components 108, 110, 112, and/or 114, and/or other components by software; hardware; firmware; some combination of software, hardware, and/or firmware; and/or other mechanisms for configuring processing capabilities on processor(s) 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116 are illustrated in FIG. 1 as being implemented within a single processing unit, in implementations in which processor(s) 120 includes multiple processing units, one or more of components 108, 110, 112, 114, and/or 116 may be implemented remotely from the other components. The description of the functionality provided by the different components 108, 110, 112, 114, and/or 116 described below is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116. As another example, processor(s) 120 may be configured to execute one or more additional components that may perform some or all of the functionality attributed below to one of components 108, 110, 112, 114, and/or 116.

Figure 2:
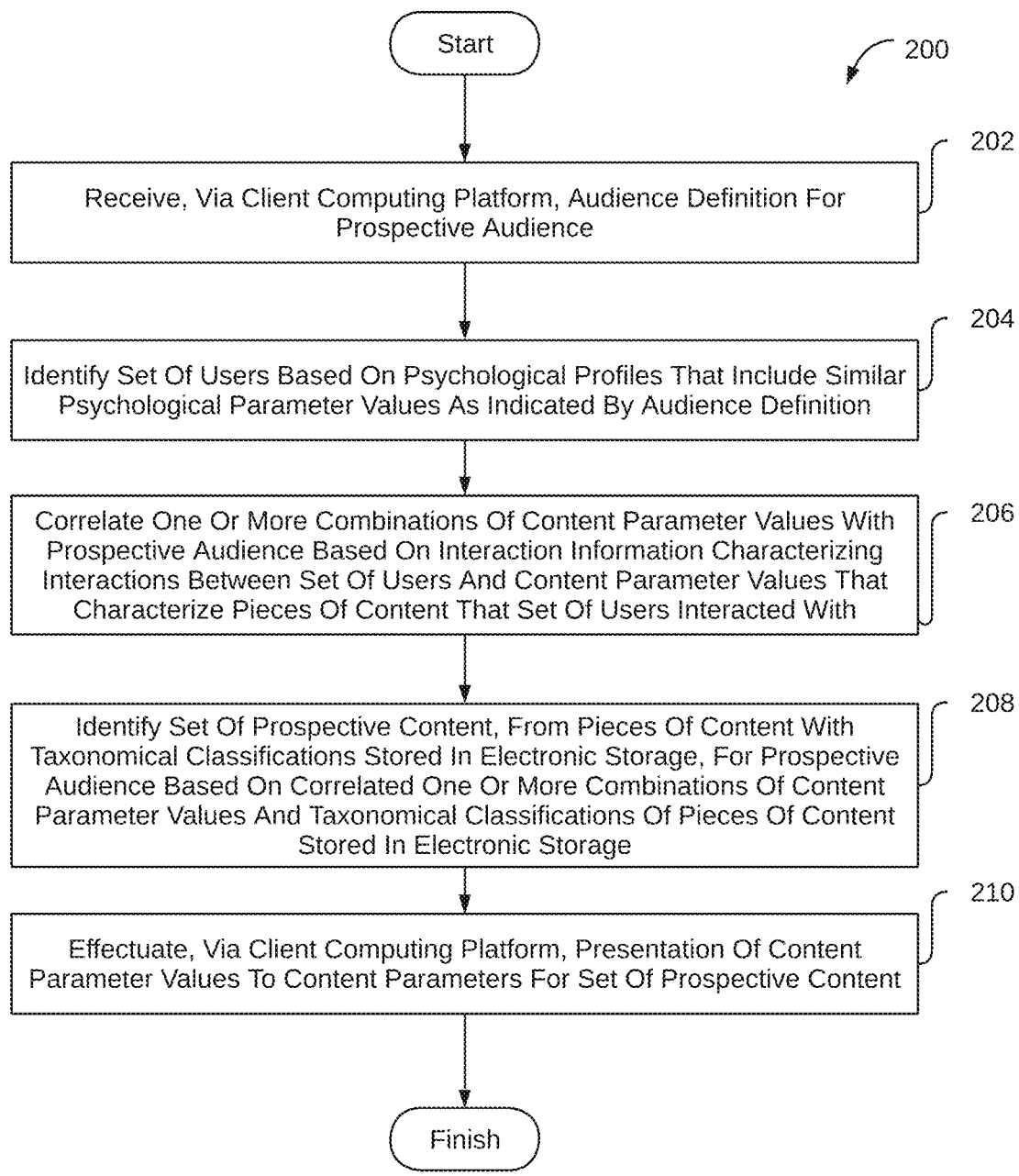
FIG. 2 illustrates a method to identify taxonomical classifications of target content for prospective audience, in accordance with one or more implementations.

FIG. 2 illustrates a method 200 to identify taxonomical classifications of target content for prospective audience, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving, via a client computing platform, an audience definition for a prospective audience. The audience definition may include psychological parameter values to a set of psychological parameters. Electronic storage may be configured to store i) taxonomical classifications of individual pieces of content, ii) psychological profiles for users of digital environments, and iii) interaction information that characterizes interactions between users and the pieces of content via the digital environments. Individual taxonomical classifications may include content parameter values for content parameters that define classifications for the individual pieces of content. The taxonomical classifications may conform to a taxonomy that defines a hierarchical system of the content parameters that facilitate providing the pieces of content with the classifications. The pieces of content may be defined by the content parameter values for some or all of the content parameters. The psychological profiles may include psychological parameter values for the psychological parameters. Operation 202 may be performed by one or more hardware processors configured by machine-readable instructions including a component that is the same as or similar to audience definition receiving component 108, in accordance with one or more implementations.

An operation 204 may include identifying a set of the users based on the psychological profiles that include similar psychological parameter values as indicated by the audience definition. Operation 204 may be performed by one or more hardware processors configured by machine-readable instructions including a component that is the same as or similar to user identifying component 110, in accordance with one or more implementations.

An operation 206 may include correlating one or more combinations of content parameter values with the prospective audience based on the interaction information characterizing interactions between the set of the users and the content parameter values that characterize the pieces of content that the set of the users interacted with. Operation 206 may be performed by one or more hardware processors configured by machine-readable instructions including a component that is the same as or similar to combination correlation component 112, in accordance with one or more implementations.

An operation 208 may include identifying a set of prospective content, from the pieces of content with taxonomical classifications stored in the electronic storage, for the prospective audience based on the correlated one or more combinations of the content parameter values and the taxonomical classifications of the pieces of content stored in the electronic storage. Operation 208 may be performed by one or more hardware processors configured by machine-readable instructions including a component that is the same as or similar to prospective content identifying component 114, in accordance with one or more implementations.

An operation 210 may include effectuating, via the client computing platform, presentation of the content parameter values to the content parameters for the set of prospective content. Operation 210 may be performed by one or more hardware processors configured by machine-readable instructions including a component that is the same as or similar to presentation effectuation component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to identify target taxonomical classifications of content based on a prospective audience and a taxonomy for pieces of content, the system comprising:

electronic storage configured to store:
i) classification information, the classification information defining taxonomical classifications of individual pieces of content, wherein individual taxonomical classifications include content parameter values for content parameters that define classifications for the individual pieces of content, wherein the taxonomical classifications conform to a taxonomy that defines a hierarchical system of the content parameters that facilitate providing the pieces of content with the classifications, wherein the pieces of content are defined by the content parameter values for some or all of the content parameters,
ii) psychological profiles for users of digital environments, wherein the psychological profiles include psychological parameter values for psychological parameters, and
iii) interaction information that characterizes interactions between users and the pieces of content via the digital environments; and
one or more processors configured by machine-readable instructions to:
receive, simultaneously from individual client computing platforms associated with individual ones of the digital environments, individual audience definitions for individual prospective audiences of the individual digital environments, wherein the individual audience definitions include psychological parameter values to individual sets of the psychological parameters;
identify sets of the users based on the psychological profiles that include similar psychological parameter values as indicated by the audience definitions;
correlate one or more combinations of content parameter values with the prospective audiences based on the interaction information characterizing interactions by the set of the users with the pieces of content and the content parameter values that characterize the pieces of content that the set of the users interacted with, wherein the interaction information includes at least movement information that defines changes in the pieces of content in the digital environments caused by user-controlled pieces of content and actions of the user-controlled pieces of content that caused the changes, wherein the user-controlled pieces of content include characters in the digital environments, wherein the changes in the pieces of content include a change in orientation and displacement;
identify sets of prospective content, from the pieces of content with taxonomical classifications stored in the electronic storage, for the prospective audiences based on the correlated one or more combinations of the content parameter values and the taxonomical classifications of the pieces of content stored in the electronic storage; and
effectuate, via the client computing platforms, presentation of the content parameter values to the content parameters for the sets of prospective content.

2. The system of claim 1, wherein the one or more processors are further configured by the machine-readable instructions to:
effectuate, via the client computing platforms, presentation of the psychological parameters collectively included in the psychological profiles to enable requesting users associated with the digital environments to provide the psychological parameter values as the audience definitions.

3. The system of claim 1, wherein the interaction information includes timing information, and/or expense information related to the interactions with the content.

4. The system of claim 1, wherein the psychological profiles are based on stated information.

5. The system of claim 4, wherein the stated information includes answers of the users to questions presented to the users.

6. The system of claim 1, wherein the psychological profiles are associated with and/or generated in relation with particular online games, and/or online applications within the digital environments.

7. The system of claim 1, wherein the interaction information indicates whether the users have affinities for the individual pieces of content or aversions to the individual pieces of content.

8. The system of claim 1, wherein correlating the one or more combinations of content parameter values with the prospective audiences is based on the sets of the users having affinities with particular ones of the pieces of content that have taxonomical classifications stored in the electronic storage, wherein the correlations convey that the one or more combinations of the content parameter values for the particular pieces of content are valued by the sets of the users.

9. The system of claim 1, wherein identifying the sets of prospective content for the prospective audiences is performed by determining the pieces of content with commonalities between the content parameter values that define the pieces of content and the one or more combinations of content parameter values.

10. A method to identify target taxonomical classifications of content based on a prospective audience and a taxonomy for pieces of content, the method comprising:
receiving, simultaneously by one or more processors from individual client computing platforms associated with individual digital environments, individual audience definitions for individual prospective audiences of the individual digital environments, wherein the individual audience definitions include psychological parameter values to individual sets of psychological parameters, wherein electronic storage configured to store:
 i) classification information, the classification information defining taxonomical classifications of individual pieces of content, wherein individual taxonomical classifications include content parameter values for content parameters that define classifications for the individual pieces of content, wherein the taxonomical classifications conform to a taxonomy that defines a hierarchical system of the content parameters that facilitate providing the pieces of content with the classifications, wherein the pieces of content are defined by the content parameter values for some or all of the content parameters,
 ii) psychological profiles for users of digital environments, wherein the psychological profiles include psychological parameter values for psychological parameters, and
 iii) interaction information that characterizes interactions between users and the pieces of content via the digital environments;
identifying, by the one or more processors, sets of the users based on the psychological profiles that include similar psychological parameter values as indicated by the audience definitions;
correlating, by the one or more processors, one or more combinations of content parameter values with the prospective audiences based on the interaction information characterizing interactions by the set of the users with the pieces of content and the content parameter values that characterize the pieces of content that the set of the users interacted with, wherein the interaction information includes at least movement information that defines changes in the pieces of content in the digital environments caused by user-controlled pieces of content and actions of the user-controlled pieces of content that caused the changes, wherein the user-controlled pieces of content include characters in the digital environments, wherein the changes in the pieces of content include a change in orientation and displacement;
identifying, by the one or more processors, sets of prospective content, from the pieces of content with taxonomical classifications stored in the electronic storage, for the prospective audiences based on the correlated one or more combinations of the content parameter values and the taxonomical classifications of the pieces of content stored in the electronic storage; and
effectuating, by the one or more processors and via the client computing platforms, presentation of the content parameter values to the content parameters for the sets of prospective content.

11. The method of claim 10, further comprising:
effectuating, via the client computing platforms, presentation of the psychological parameters collectively included in the psychological profiles to enable requesting users associated with the digital environments to provide the psychological parameter values as the audience definitions.

12. The method of claim 10, wherein the interaction information includes timing information, and/or expense information, related to the interactions with the content.

13. The method of claim 10, wherein the psychological profiles are based on stated information.

14. The method of claim 13, wherein the stated information includes answers of the users to questions presented to the users.

15. The method of claim 10, wherein the psychological profiles are associated with and/or generated in relation with particular online games, and/or online applications within the digital environments.

16. The method of claim 10, wherein the interaction information includes whether the users have affinities for the individual pieces of content or aversions to the individual pieces of content.

17. The method of claim 10, wherein correlating the one or more combinations of content parameter values with the prospective audiences is based on the sets of the users having affinities with particular ones of the pieces of content that have taxonomical classifications stored in the electronic storage, wherein the correlations convey that the one or more combinations of the content parameter values for the particular pieces of content are valued by the sets of the users.

18. The method of claim 10, wherein identifying the sets of prospective content for the prospective audiences is performed by determining the pieces of content with commonalities between the content parameter values that define the pieces of content and the one or more combinations of content parameter values.

* * * * *